Mar. 3, 1925. Re. 16,010

J. PENROD ET AL

PUMPING EQUIPMENT FOR WELLS

Original Filed Nov. 10, 1920 2 Sheets-Sheet 1

Inventor
J. PENROD,
R. D. THOMPSON,

By S. G. Quesada
Attorney

Mar. 3, 1925.

Re. 16,010

J. PENROD ET AL

PUMPING EQUIPMENT FOR WELLS

Original Filed Nov. 10, 1920 2 Sheets-Sheet 2

Inventor
J. PENROD,
R. D. THOMPSON,

By G. G. Quesada
Attorney

Reissued Mar. 3, 1925.

Re. 16,010

UNITED STATES PATENT OFFICE.

JOHN PENROD AND ROBERT D. THOMPSON, OF OKMULGEE, OKLAHOMA.

PUMPING EQUIPMENT FOR WELLS.

Original No. 1,413,130, dated April 18, 1922, Serial No. 423,082, filed November 10, 1920. Application for reissue filed April 5, 1924. Serial No. 704,534.

*To all whom it may concern:*

Be it known that we, JOHN PENROD and ROBERT D. THOMPSON, citizens of the United States, residing at Okmulgee, in the county of Okmulgee, State of Oklahoma, have invented certain new and useful Improvements in Pumping Equipments for Wells, of which the following is a specification.

Well pumps of which we knew before the time of our invention employed a plunger consisting of a liner and upper and lower valves more or less permanently located in the liner and when it became necessary to bring the valves to the surface for repair the entire plunger including the liner would also have to be elevated through the tubing.

It will be seen that since the plunger must be small enough to be freely movable through the tubing its pumping capacity must be substantially less than the capacity of the tubing to conduct the fluid to the surface.

Therefore, the plunger cannot pump as much or nearly as much fluid as the tubing is capable of conducting to the surface and this greatly retards production.

Our invention overcomes this inefficiency by making it possible to separate the upper and lower valves from the plunger liner and bring these valves to the surface for repair without the liner, thereby making it possible to employ much larger valves than those which are more or less permanently located in the liner and which can be removed only by removing the liner also.

Further, in accordance with this invention the plunger liner is permanently located below the tubing and is not movable through the tubing; thus the displacement of the liner is in no way controlled or limited by the diameter of the tubing and may be great enough to bring about the pumping of as much or nearly as much fluid as the tubing is capable of conducting to the surface.

A further object of the invention is to provide a novel clutching mechanism by means of which the valve carrying unit, as the same may be said to be, may be detachably connected to the plunger liner.

Another major object is to provide means whereby a standing valve of a greater diameter than the diameter of the tubing may be employed so that a maximum quantity of fluid may be admitted to the working barrel on each up stroke of the plunger.

Other objects and advantages will be apparent during the course of the following description.

Figure 1:
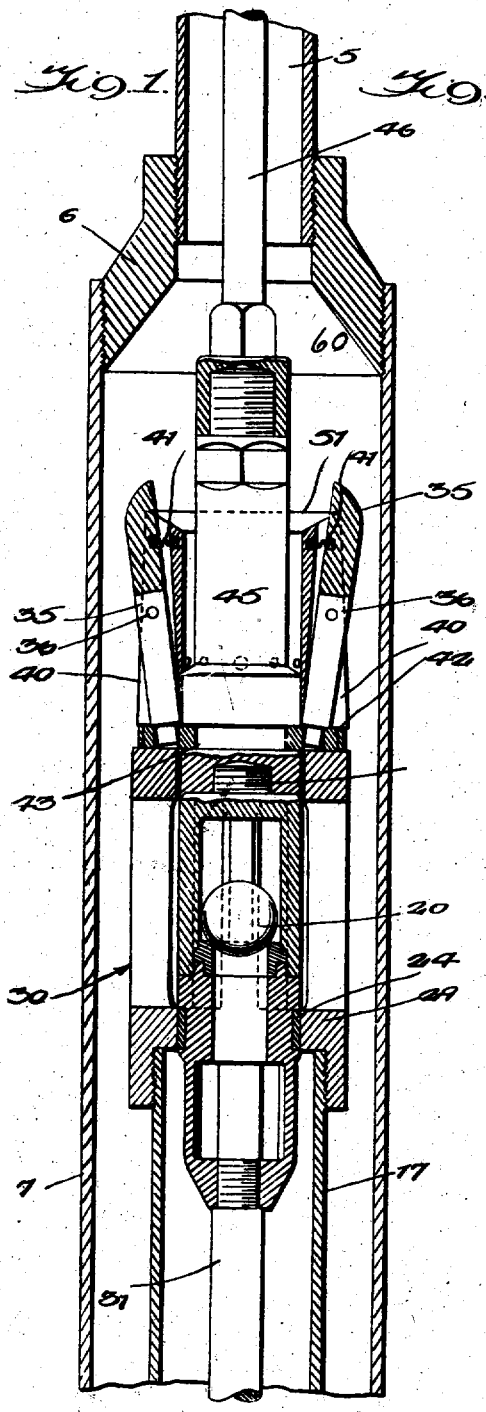
Figure 2:
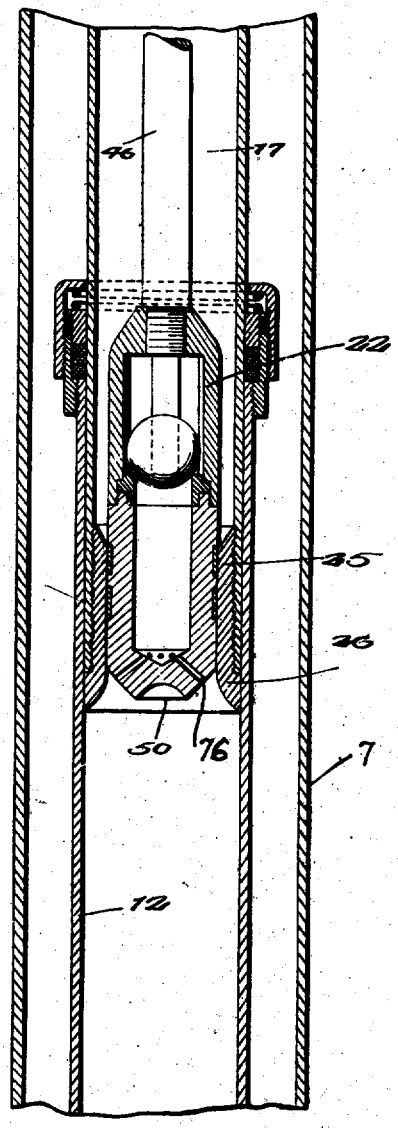
Figure 3:
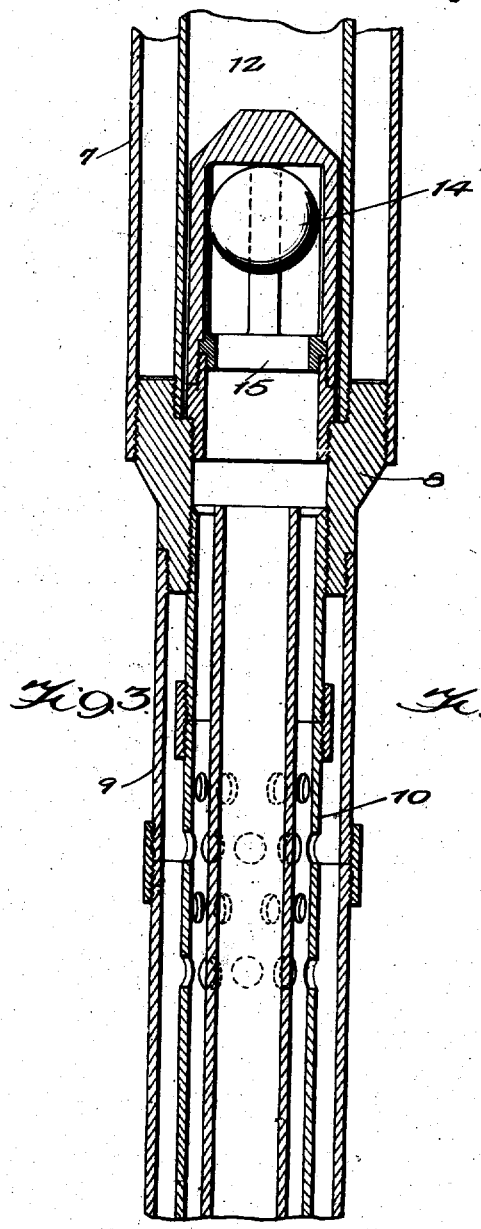
Figure 4:
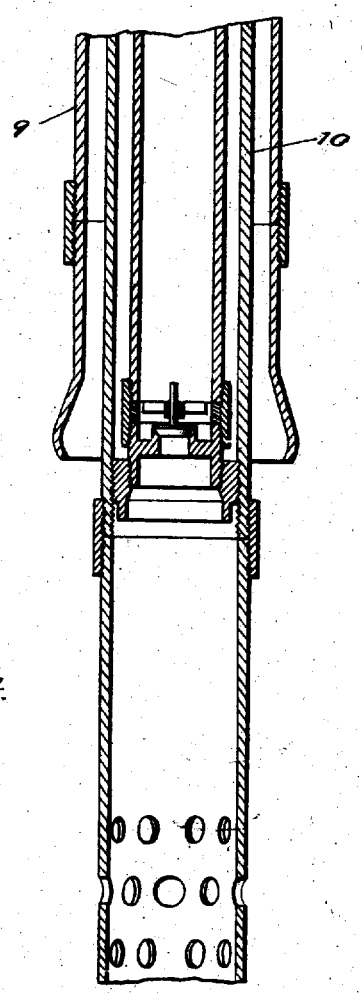

In the accompanying drawing forming a part of this application and in which like numerals are employed to designate like parts throughout the same, Figure 1 is a detail sectional view through the upper portion of the pumping mechanism, Figure 2 is a vertical sectional view through the intermediate portion of the pumping mechanism, Figure 3 is a vertical sectional view through the lower portion of the mechanism and the upper portion of the fluid inlet, Figure 4 is a detail vertical sectional view through the lower portion of the inlet, In the drawing, wherein for the purpose of illustration is shown a preferred embodiment of the invention, the numeral 5 designates a tubing to which a reducer bushing 6 is connected and as shown in Fig. 1 a shell 7 is connected at its upper end to the bushing. A second bushing 8 is, as illustrated in Fig. 3, connected to the lower end of the shell 7 and supports what might be said to be a gas trapping tube 9, within which a perforated inlet nipple 10 is arranged. As the oil and gas inlet forms the subject matter of United States patent No. 1,440,100 it need not be further described here.

Referring to the subject matter of this invention, it will be seen that a working barrel 12 is connected at its lower end to the bushing 8 and it surrounds a standing valve 14. The standing valve 14 is of the ball type and is enclosed within the usual cage.

The working barrel 12 terminates a suitable distance below the bushing 6 and receives the liner 17 of a plunger. The liner 17 has a substantial displacement and receives what might be said to be a valve carrying unit, the said valve carrying unit consisting of an upper valve member 20, and a lower valve member 22. The cages of the upper and lower valve members are provided with packing elements 24 and 25, respectively. The packing elements 25 which are carried by the lower valve member 22 engage the bushing 26 threaded or otherwise secured in the lower end of the liner 17. The packing element 24 which may be of any desired material is carried by the upper valve member and is adapted to be engaged with an internal shoulder 29 on the head 30 of the plunger liner 17.

As stated, the valve carrying unit consists of upper and lower valve members and these valve members are connected by a rod 31 which is extended through the plunger liner. Of course, the rod 31 occupies only a small amount of space in the plunger liner 17 and, therefore, does not in any way obstruct the passage of fluid through the liner. Also, it will be seen that the cages of the valve members 20 and 22 are slotted for the free passage of oil or other fluid being pumped. Fluid is admitted to the plunger by openings 76 in the lower portion of the liner.

The valve carrying unit is lowered down through the tubing and is clutched onto the liner for reciprocation therewith by means of a plurality of arms 35 pivoted intermediate their ends as indicated at 36 to the head 30 of the liner. Fig. 1 plainly illustrates that the arms are received in grooves 40 in the head 30 and that springs 41 are confined between the inner walls of the grooves 40 and the inner sides of the arms 35 and urge the upper portions of the arms outwardly while the lower portions of the arms are urged inwardly. The lower portions of the arms 35 have connection with dogs 42 which are urged by the springs 41 into an annular groove 43 in the shank or attaching portion 45 of the valve carrying unit.

It is believed to be obvious that when the dogs 42 are positioned in the annular groove 43 the valve carrying unit is clutched to the liner so the liner is caused to reciprocate with the valve carrying unit. A sucker rod 46 is connected in any suitable manner to the shank 45.

In operation the valve carrying unit consisting of the upper and lower valve members and the rod 31 for connecting the same is lowered down through the tubing and may be sufficiently smaller than the tubing to pass freely through the same. When the valve carrying unit enters the shell 7 the more or less tapered lower end 50 of the lower valve member 22 will possibly strike the inwardly beveled upper end 51 of the head 30 and the valve carrying unit will be guided into and through the head 30. The valve carrying unit will continue its downward movement through the plunger liner until the packing elements 24 and 25 are firmly seated and the dogs 42 are received in the annular groove 43 whereby the valve carrying unit is securely clutched onto the liner. The sucker rod is now given its normal stroke and due to the extremely large displacement of the liner 17 the quantity of fluid pumped will approach the capacity of the tubing to convey the fluid to the surface.

Particular attention is directed to the fact that the plunger liner 17 at no time moves through the tubing and consequently is not in any way limited in diameter by the tubing.

In the normal operation of the pump the plunger liner remains connected to the valve carrying unit and if it is desired to withdraw the valve carrying unit for repair, the normal, upward stroke of the sucker rod is exceeded so that the rounded upper ends of the arms 35 are engaged with the beveled lower surface 60 of the bushing 6 whereupon the arms are swung on their pivots 36 for releasing the dogs 42 from the annular groove 43.

When the dogs 42 are withdrawn from the groove 43 the valve carrying unit may be drawn through the tubing without the plunger liner, and the plunger liner will gradually settle in the working barrel. However, it will assume a receptive position so that when the valve carrying unit is returned to the well it may readily enter and be clutched onto the liner by the spring actuated arms 35.

One of the principal advantages of the invention resides in the largely increased pumping capacity of the plunger and in the provision of means whereby valves of unusually large diameter in comparison to the diameter of the tubing may be employed, all of which is brought about by the more or less permanent location of the plunger liner below the tubing and in making it unnecessary to move the plunger liner through the tubing. The plunger liner is in fact substantially greater in diameter than the diameter of the tubing and on each stroke pumps a substantial quantity of fluid to provide for maximum production.

The working barrel 12 is arranged in spaced relation to the wall of the shell and co-operates with the shell in the formation of an annular sand trap to receive the fine floating sand which settles when the well is not in operation. This annular sand pocket or trap is of a very generous size and it is unnecessary to frequently pull the tubing to remove the sand from the pocket.

Figure 3 illustrates that the standing valve 14 is permanently located beneath the tubing and is greater in diameter than the diameter of the tubing. For a 2″ tubing a 2¾″ or a 3¾″ inch standing valve may be used. Thus as much fluid may be admitted by the standing valve as the tubing is capable of conducting to the surface.

In summarizing it will be seen that the capacity of the pump is not in any way restricted by the tubing and that reliable means are provided to prevent sand from settling on the working parts of the pump.

Particular attention is directed to Figure 3 which plainly illustrates that the standing valve 14 is provided with an attaching portion threaded into the bushing 8 to which the shell 7 is connected. The working barrel 12 completely surrounds the standing valve and is threaded into the bushing 8 adjacent the attaching nipple of the standing valve. The standing valve 12 is large enough to freely admit enough fluid to the working barrel to completely fill the working barrel on each up stroke of the plunger notwithstanding the fact that the working barrel is substantially greater in diameter than the tubing. As previously stated, the plunger which operates in the working barrel has a pumping capacity which approaches and which may even exceed the capacity of the tubing, and consequently maximum production of fluid and maximum efficiency of the tubing is brought about.

Having thus described the invention, what is claimed is:—

1. The combination with a tubing, of a liner permanently located beneath the tubing, the external diameter of the liner being greater than the internal diameter of the tubing, and a valve carrying unit detachably positioned in said liner and co-operating with the same in the formation of a plunger, said valve carrying unit being removable through the tubing.

2. The combination with a tubing, of a liner permanetly located beneath the tubing, the external diameter of the liner being greater than the internal diameter of the tubing, a valve carrying unit detachably positioned in said liner and co-operating with the same in the formation of a plunger, and means whereby to detachably clutch the liner onto the valve carrying unit, said valve carrying unit being removable through the tubing.

3. The combination with a tubing, of a liner located beneath the tubing, the external diameter of the liner being greater than the internal diameter of the tubing, a valve carrying unit detachably positioned in said liner and co-operating with the same in the formation of a plunger, and means whereby to detachably cluch the liner onto the valve carrying unit, said valve carrying unit consisting of the upper and lower valves arranged adjacent the ends of the liner.

4. The combination with a tubing, of a liner permanently located beneath the tubing, a valve carrying unit detachably positioned in said liner and co-operating with the same in the formation of a plunger, means whereby to detachably clutch the liner onto the valve carrying unit, said valve carrying unit consisting of upper and lower valves arranged adjacent the ends of the liner, and a working barrel receiving said plunger.

5. The combination with a tubing, of a liner permanently located beneath the tubing and being of a greater diameter than the tubing, a valve carrying unit detachably positioned in the liner, and a clutching device carried by said liner and engaging said valve carrying unit to detachably connect the valve carrying unit to the liner, said valve carrying unit being removable from said liner and being movable through the tubing independently of the liner.

6. The combination with a tubing, of a liner permanently located beneath the tubing, a valve carrying unit detachably positioned in the liner, a clutching device carried by said liner and engaging said valve carrying unit to detachably connect the valve carrying unit to the liner, said valve carrying unit being removable from said liner and being movable through the tubing independently of the liner, and means arranged in the path of travel of the clutching device of said liner to release the clutching device from engagement with the valve carrying unit.

7. The combination with a tubing, of a liner permanently located beneath the tubing and being of a diameter greater than the diameter of the tubing, and a valve carrying unit detachably positioned in the liner and co-operating with the same in the formation of a plunger, said valve carrying unit consisting of upper and lower valve members and a rod connecting the valve members.

8. The combination of a shell, a working barrel positioned in the shell, a liner received in the working barrel, a valve carrying unit adapted to be detachably positioned in the liner and co-operating with the liner in the formation of a plunger, said valve carrying unit consisting of upper and lower one-way valves and means connecting the one-way valves, and means for detachably clutching the liner onto the valve carrying unit, said valve carrying unit being movable through the tubing independently of the liner.

9. A pump comprising a liner, a valve carrying unit adapted to be positioned in the liner to co-operate with the liner in the formation of a plunger, said valve carrying unit consisting of upper and lower valve members, and means to detachably clutch the liner onto the valve carrying unit.

10. A pump comprising a liner, a valve carrying unit adapted to be positioned in the liner to co-operate with the liner in the formation of a plunger, said valve carrying unit consisting of upper and lower valve members, and means to detachably clutch the liner onto the valve carrying unit, there being a connector between the upper and lower valve members.

11. A pump comprising a liner, a valve assembly detachably positioned in the liner and co-operating with the liner in the formation of a plunger, said valve assembly consisting of upper and lower one-way valves arranged adjacent the end of the liner, a clutching device for detachably connecting the valve assembly to the liner, and consisting of a plurality of spring actuated dogs, and means establishing a liquid tight connection between the liner and the one-way valves.

12. A pump comprising a tubing, a shell secured to the tubing, a working barrel positioned in the shell and terminating below the upper end of the same, a liner positioned in the working barrel, a valve carrying unit detachably positioned in the liner and having valves arranged adjacent the ends of the liner whereby to co-operate with the liner in the formation of a plunger, said valve carrying unit being provided with a recessed portion, pivoted arms having dogs adapted to be received in said recessed portion, and means connecting the shell to the tubing and arranged in the path of travel of said arms to swing the arms on their pivots and thereby release the dogs from engagement with the recessed portion of said valve carrying unit whereby to permit of the removal of the valve carrying unit through the tubing independently of the liner.

13. A pump for use in wells comprising a shell, an attaching bushing connected to the shell, a working barrel arranged within the shell and co-operating with the same in the formation of a sand pocket, a liner positioned in the working barrel and having an approximately tubular head, spring actuated arms carried by said head and having dogs, a valve carrying unit detachably arranged in said liner and co-operating with the same in the formation of a plunger, said valve carrying unit being provided with an annular groove to receive said dogs, the upper portions of said arms being arranged in the path of travel of said bushing and actuated thereby when the normal upward stroke of the plunger is exceeded.

JOHN PENROD.
ROBERT D. THOMPSON.